(12) United States Patent
Ozawa (10) Patent No.: US 10,910,887 B2
(45) Date of Patent: Feb. 2, 2021

(54) WIRELESS POWER RECEIVING DEVICE AND WIRELESS POWER TRANSMISSION SYSTEM

(71) Applicant: TDK CORPORATION, Tokyo (JP)

(72) Inventor: Yasuhiro Ozawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/488,827

(22) PCT Filed: Mar. 31, 2017

(86) PCT No.: PCT/JP2017/013602
§ 371 (c)(1),
(2) Date: Aug. 26, 2019

(87) PCT Pub. No.: WO2018/179337
PCT Pub. Date: Oct. 4, 2018

(65) Prior Publication Data
US 2020/0067354 A1    Feb. 27, 2020

(51) Int. Cl.
*H02J 50/80*  (2016.01)
*H02J 50/10*  (2016.01)
*H02M 7/217*  (2006.01)
*H02J 5/00*  (2016.01)

(52) U.S. Cl.
CPC ............. *H02J 50/80* (2016.02); *H02J 5/005* (2013.01); *H02J 50/10* (2016.02); *H02M 7/2176* (2013.01)

(58) Field of Classification Search
None
See application file for complete search history.

(56) References Cited

U.S. PATENT DOCUMENTS

| | | | |
|---|---|---|---|
| 8,803,365 B2* | 8/2014 | Lee | H04B 5/0056 307/104 |
| 2012/0313448 A1* | 12/2012 | Anttila | H02J 50/12 307/104 |
| 2018/0109143 A1* | 4/2018 | Kashiwagi | H04B 5/0081 |

FOREIGN PATENT DOCUMENTS

JP    2014-072966 A    4/2014

OTHER PUBLICATIONS

International Search Report issued in corresponding International Patent Application No. PCT/JP2017/013602, dated May 23, 2017, with English Translation.

* cited by examiner

*Primary Examiner* — Jared Fureman
*Assistant Examiner* — Joel Barnett
(74) *Attorney, Agent, or Firm* — McDermott Will & Emery LLP (57) ABSTRACT

A wireless power receiving device includes a receiving coil that receives AC power through an AC magnetic field, a rectification circuit that converts the AC power received by the receiving coil into DC power and outputs the obtained DC power to a load, a filter circuit provided between the rectification circuit and the load, an input voltage detection circuit that detects the input voltage of the filter circuit, an output voltage detection circuit that detects the output voltage of the filter circuit, a target voltage generation circuit that generates a second target voltage that is a target value of the input voltage based on the output voltage and a first target voltage that is a target value of the output voltage, and a receiving-side transmitter that transmits difference information indicating the difference between the input voltage and the second target voltage to the wireless power transmitting device.

9 Claims, 7 Drawing Sheets

WIRELESS POWER RECEIVING DEVICE AND WIRELESS POWER TRANSMISSION SYSTEM

CROSS REFERENCE

This application is the U.S. National Phase under 35 U.S.C., § 371 of International Application No. PCT/JP2017/013602, filed on Mar. 31, 2017, the entire contents is hereby incorporated by reference.

TECHNICAL FIELD

The present invention relates to a wireless power receiving device and a wireless power transmission system.

BACKGROUND ART

There is known a wireless power transmission system configured to perform power transmission by wireless power transmission technology. The wireless power transmission system includes a wireless power transmitting device that transmits power and a wireless power receiving device that receives the power transmitted from the wireless power transmitting device.

For example, the wireless power transmission technology is used for charging a load (e.g., a secondary battery) mounted in a smartphone or an electric car. In this case, the wireless power transmitting device is a charger, and the wireless power receiving device is installed in a smartphone or an electric car. A load to be charged by the wireless power transmission technology mainly includes a lithium-ion battery.

Patent Document 1 discloses an example of the wireless power transmission system. In this example, the wireless power receiving device includes a filter circuit provided at the rear stage of a rectification circuit. The filter circuit plays a role of reducing ripple voltage generated by the operation of a switching power supply provided in the wireless power transmitting device.

CITATION LIST

[Patent Document]
[Patent Document 1] JP 2014-72966 A

SUMMARY OF INVENTION

Technical Problem to be Solved by Invention

The present inventor considers feedback control of voltage to be applied to a load in the wireless power transmission system. Specifically, the present inventor considers controlling the output of the wireless power transmitting device such that the voltage to be applied to a load becomes equal to its target value.

However, in the course of the study, it has been found that the feedback control may not be performed suitably when a filter circuit as described in Patent Document 1 exists in the wireless power receiving device. The details will be described below.

When a filter circuit as described in Patent Document 1 is provided in the wireless power receiving device, the output voltage of the filter circuit is applied to a load. Therefore, when the output voltage of the filter circuit is fed to the wireless power transmitting device side, feedback control can be performed in some way; however, a delay generally occurs in the filter circuit, so that feedback speed becomes lower, making it difficult to secure stability of power control. In this case, it can be considered that the input voltage to the filter circuit is fed to the wireless power transmitting device side; however, this causes another problem that voltage to be applied to a load falls. That is, the input voltage is generally higher than the output voltage by a dropped voltage in the filter circuit. Thus, that the input voltage is equal to its target value means that voltage to be applied to a load falls by the dropped voltage in the filter circuit.

It is therefore an object of the present invention to provide a wireless power receiving device and a wireless power transmission system capable of suitably performing feedback control when a filter circuit is provided at the front stage of a load.

Means for Solving the Problem

A wireless power receiving device according to the present invention is a wireless power receiving device that receives, by wireless, power transmitted from a wireless power transmitting device and includes a receiving coil that receives AC power through an AC magnetic field, a rectification circuit that converts the AC power received by the receiving coil into DC power and outputs the obtained DC power to a load, a filter circuit provided between the rectification circuit and the load, an input voltage detection circuit that detects the input voltage of the filter circuit, an output voltage detection circuit that detects the output voltage of the filter circuit, a target voltage generation circuit that generates a second target voltage that is a target value of the input voltage based on the output voltage and a first target voltage that is a target value of the output voltage, and a receiving-side transmitter that transmits difference information indicating the difference between the input voltage and the second target voltage to the wireless power transmitting device.

According to the present invention, when the output voltage is smaller than the first target voltage, the second target voltage can be generated in such a direction as to increase the input voltage; while when the output voltage is larger than the first target voltage, the second target voltage can be generated in such a direction as to reduce the input voltage. As a result, it is possible to converge the output voltage to the first target voltage with the input voltage as a target of feedback control. Thus, it is possible to suitably perform feedback control even when the filter circuit is provided at the front stage of the load.

In the above wireless power receiving device, the target voltage generation circuit may include a subtracting circuit that calculates a differential voltage between the input voltage and the output voltage and an adding circuit that adds the differential voltage to the first target voltage to thereby generate the second target voltage. This allows the second target voltage to be suitably generated by the target voltage generation circuit.

In the above wireless power receiving device, the target voltage generation circuit may include a subtracting circuit that calculates a differential voltage between the output voltage and the first target voltage and an adding circuit that adds the differential voltage to the input voltage to thereby generate the second target voltage. This also allows the second target voltage to be suitably generated by the target voltage generation circuit.

In the above wireless power receiving device, the receiving-side transmitter may transmit an error signal to the wireless power transmitting device when the second target voltage exceeds a reference value. This allows a failure of the filter circuit to be detected.

The above wireless power receiving device may further include a charging state detection circuit that determines the charge state of the load based on a change in the differential voltage. This allows the charging state of the load as a secondary battery to be grasped by utilizing the output of a circuit for feedback control.

In the above wireless power receiving device, the input voltage detection circuit may detect the input voltage as an effective value, and the output voltage detection circuit may detect the output voltage as an effective value. This can reduce the influence of ripple voltage on the input voltage and output voltage, allowing the second target voltage to be generated accurately.

A wireless power transmission system according to the present invention is a wireless power transmission system that transmits power from a wireless power transmitting device to a wireless power receiving device by wireless, wherein the wireless power transmitting device includes a power conversion circuit that converts input DC power into AC power, a feeding coil that generates an AC magnetic field by receiving the AC power from the power conversion circuit, and a feeding-side transmitter that exchanges information with the wireless power receiving device, the wireless power receiving device is one of the above-described wireless power receiving devices, and the power conversion circuit controls AC power to be supplied to the feeding coil based on the difference information transmitted from the receiving-side transmitter to the feeding-side transmitter.

According to the present invention, when the output voltage is smaller than the first target voltage, the second target voltage can be generated in such a direction as to increase the input voltage; while when the output voltage is larger than the first target voltage, the second target voltage can be generated in such a direction as to reduce the input voltage. Then, the power conversion circuit controls the output of the feeding coil so as to make the thus generated second target voltage and the input voltage equal to each other, whereby the output voltage can be converged to the first target voltage. Thus, it is possible to suitably perform feedback control even when the filter circuit is provided at the front stage of the load.

A wireless power transmission system according to another aspect of the present invention is a wireless power transmission system that transmits power from a wireless power transmitting device to a wireless power receiving device by wireless, wherein the wireless power transmitting device includes a power conversion circuit that converts input DC power into AC power, a feeding coil that generates an AC magnetic field by receiving the AC power from the power conversion circuit, and a feeding-side transmitter that exchanges information with the wireless power receiving device, and the wireless power receiving device includes a receiving coil that receives AC power through the AC magnetic field, a rectification circuit that converts the AC power received by the receiving coil into DC power and outputs the obtained DC power to a load, a filter circuit provided between the rectification circuit and the load, an input voltage detection circuit that detects the input voltage of the filter circuit, an output voltage detection circuit that detects the output voltage of the filter circuit, and a receiving-side transmitter that transmits the input voltage and the output voltage to the wireless power transmitting device. The wireless power transmitting device further has a target voltage generation circuit that generates a second target voltage as a target value of the input voltage based on the output voltage and a first target voltage as a target value of the output voltage, and the power conversion circuit controls AC power to be supplied to the feeding coil based on difference information indicating the difference between the input voltage and the second target voltage.

Also according to the present invention, when the output voltage is smaller than the first target voltage, the second target voltage can be generated in such a direction as to increase the input voltage; while when the output voltage is larger than the first target voltage, the second target voltage can be generated in such a direction as to reduce the input voltage. Then, the power conversion circuit controls the output of the feeding coil so as to make the thus generated second target voltage and the input voltage equal to each other, whereby the output voltage can be converged to the first target voltage. Thus, it is possible to suitably perform feedback control even when the filter circuit is provided at the front stage of the load.

Advantageous Effects of the Invention

According to the present invention, it is possible to suitably perform feedback control even when the filter circuit is provided at the front stage of the load.

MODE FOR CARRYING OUT THE INVENTION

Preferred embodiments of the present invention will be explained below in detail with reference to the accompanying drawings.

Figure 1:
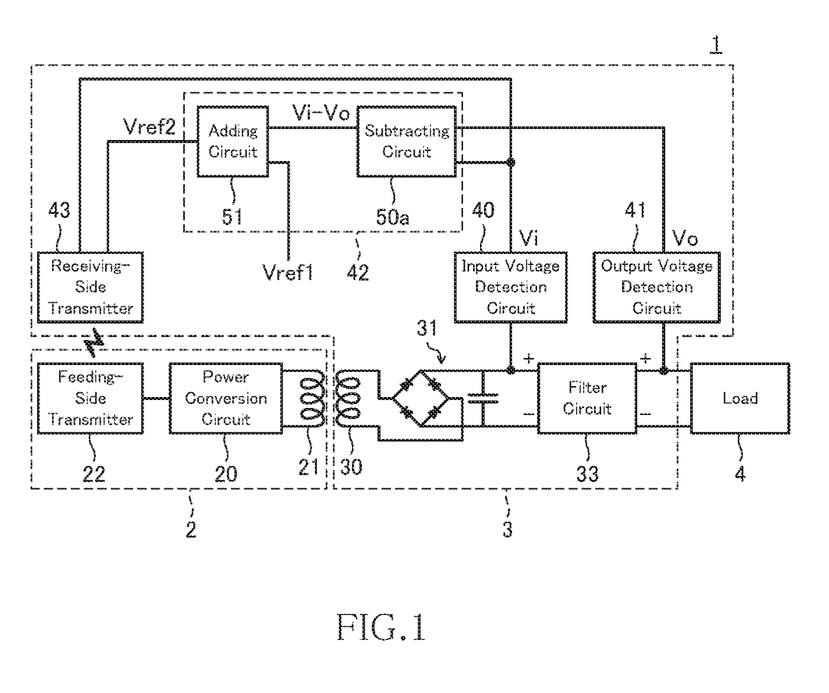
FIG. 1 is a view illustrating the configuration of a wireless power transmission system 1 according to a first embodiment of the present invention.

FIG. 1 is a view illustrating the configuration of a wireless power transmission system 1 according to the first embodiment of the present invention. As illustrated, the wireless power transmission system 1 according to the present embodiment includes a wireless power transmitting device 2 and a wireless power receiving device 3.

As illustrated in FIG. 1, the wireless power receiving device 3 is connected to a load 4. The load 4 is, for example, a secondary battery such as a lithium-ion battery and is mounted as a drive power supply in charging-type equipment such as electric cars and smartphones. The wireless power transmission system 1 has a function of transmitting power by wireless from the wireless power transmitting device 2 to the wireless power receiving device 3 and charges the load 4 utilizing this function.

The wireless power transmitting device 2 includes a power conversion circuit 20, a feeding coil 21, and a feeding-side transmitter 22. The wireless power receiving device 3 includes a receiving coil 30, a rectification circuit 31, a filter circuit 33, an input voltage detection circuit 40, an output voltage detection circuit 41, a target voltage generation circuit 42, and a receiving-side transmitter 43.

The power conversion circuit 20 has a function of converting externally supplied DC power (not illustrated) into AC power and is configured to supply the AC power obtained through the conversion to the feeding coil 21. The function of converting the DC power into AC power is constituted by a switching power supply. The power conversion circuit 20 further has a function of controlling the output of the feeding coil 21 by controlling the AC power to be supplied to the feeding coil 21 based on difference information to be described later. This point will be described later again.

The feeding coil 21 is configured to generate an AC magnetic field by receiving the AC power from the power conversion circuit 20. Power transmission by the wireless power transmitting device 2 is achieved by the AC magnetic field. A capacitor constituting a resonance circuit together with the feeding coil 21 may be provided.

The feeding-side transmitter 22 is a device that has a communication function achieved through, e.g., a Bluetooth®, a wireless LAN, optical coupling (a photo coupler), magnetic coupling (a coil), or the like and plays a role of receiving difference information to be described later from the wireless power receiving device 3 and supplying the difference information to the power conversion circuit 20.

The receiving coil 30 is configured to receive AC power through the AC magnetic field generated by the feeding coil 21. That is, when the AC magnetic field generated by the feeding coil 21 interlinks the receiving coil 30, AC power is generated in the receiving coil 30 by electromagnetic induction. The receiving coil 30 outputs the thus generated AC power to the rectification circuit 31. A capacitor constituting a resonance circuit together with the receiving coil 30 may be provided.

The rectification circuit 31 is a circuit having abridge diode and a smoothing capacitor and configured to convert the AC power received by the receiving coil 30 into a DC power and output the obtained DC power to the load 4. The power transmission from the rectification circuit 31 to the load 4 is achieved using two high-level and low-level side transmission paths. The DC power output from the rectification circuit 31 is not a complete DC power but contains a certain amount of ripple voltage. This is because the power conversion circuit 20 is constituted by the switching power supply.

The filter circuit 33 is a low-pass filter provided for reducing the ripple voltage superimposed on the DC power output from the rectification circuit 31 and is disposed between the rectification circuit 31 and the load 4. In the filter circuit 33, a delay and a voltage drop occur as described above. The wireless power receiving device 3 according to the present embodiment can suitably perform feedback control of voltage to be applied to the load 4 even when the filter circuit 33 having such a property is provided at the front stage of the load 4.

The input voltage detection circuit 40 is a circuit that detects an input voltage Vi to the filter circuit 33, and the input terminal thereof is connected to the positive-side input terminal of the filter circuit 33. The output voltage detection circuit 41 is a circuit that detects an output voltage Vo from the filter circuit 33, and the input terminal thereof is connected to the positive-side output terminal of the filter circuit 33. The input voltage detection circuit 40 detects the input voltage Vi as an effective value, and the output voltage detection circuit 41 detects the output voltage Vo as an effective value. The reason that the input and output voltages Vi and Vo are each detected as an effective value is to reduce influence of the ripple voltage on the input and output voltages Vi and Vo and thereby to accurately generate a second target voltage Vref2 to be described later.

The target voltage generation circuit 42 is a circuit that generates the second target voltage Vref2 as a target value of the input voltage Vi based on the output voltage Vo and a first target voltage Vref1 as a target value of the output voltage Vo and includes a subtracting circuit 50a and an adding circuit 51. The first target voltage Vref1 is a fixed potential supplied from a not-shown power supply provided in the wireless power receiving device 3. The value of the first target voltage Vref1 is set to an arbitrary positive value.

The subtracting circuit 50a is a circuit having two input terminals and configured to calculate the difference between voltages respectively supplied thereto. In the present embodiment, the input voltage Vi and output voltage Vo are supplied to the two input terminals, respectively, and the subtracting circuit 50a calculates the difference between the input and output voltages Vi and Vo. More specifically, the subtracting circuit 50a calculates a differential voltage Vi−Vo obtained by subtracting the output voltage Vo from the input voltage Vi.

The adding circuit 51 is a circuit having two input terminals and configured to add voltages respectively supplied thereto. In the present embodiment, the first target voltage Vref1 and differential voltage Vi−Vo output from the subtracting circuit 50a are supplied to the two input terminals, respectively, and the adding circuit 51 adds them and outputs a result of the addition. The output voltage of the adding circuit 51 is supplied as the second target voltage Vref2 to the receiving-side transmitter 43.

The second target voltage Vref2 thus generated by the target voltage generation circuit 42 can be represented by the following expression (1):

$$Vref2 = Vref1 + Vi - Vo = Vi - (Vo - Vref1) \quad (1)$$

The receiving-side transmitter 43 is a device that has a communication function achieved through, e.g., a Bluetooth®, a wireless LAN, optical coupling (a photo coupler), magnetic coupling (a coil), or the like and can carry out communication with the feeding-side transmitter 22 in the wireless power transmitting device 2. The receiving-side transmitter 43 in the present embodiment receives supply of the input voltage Vi from the input voltage detection circuit 40 and supply of the second target voltage Vref2 from the target voltage generation circuit 42 and transmits difference information indicating the difference between the input voltage Vi and the second target voltage Vref2 to the wireless power transmitting device 2. The difference information may be the input voltage Vi and second target voltage Vref2 themselves or may be a differential voltage Vi−Vref2 between the input voltage Vi and the second target voltage Vref2.

Figure 2A:
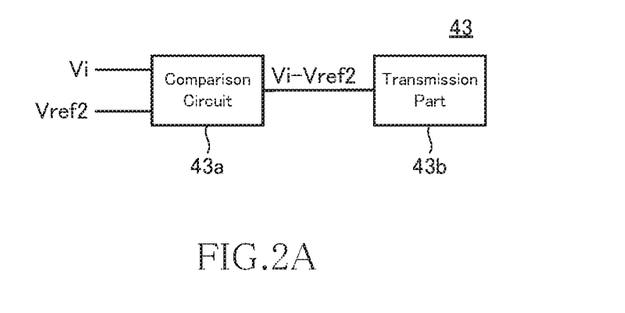
FIGS. 2A and 2B are views illustrating the internal configuration of the receiving-side transmitter 43 shown in FIG. 1.

FIG. 2 is a view illustrating the internal configuration of the receiving-side transmitter 43 when the differential voltage Vi−Vref2 is transmitted as the difference information. As illustrated in FIG. 2A, the receiving-side transmitter 43 includes a comparison circuit 43a that receives the input voltage Vi and second target voltage Vref2 and generates the differential voltage Vi−Vref2 and a transmission part 43*b* that transmits the generated differential voltage Vi−Vref2 to the wireless power transmitting device 2.

Figure 2B:
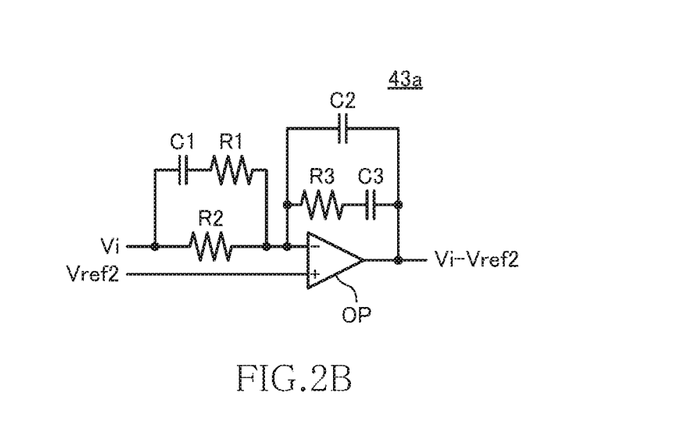

FIG. 2B illustrates a detailed circuit configuration of the comparison circuit 43*a*. As illustrated, the comparison circuit 43*a* includes an error amplifier that detects, amplifies, and outputs the difference between the input voltage Vi and the second target voltage Vref2. More specifically, the comparison circuit 43*a* includes an operation amplifier OP having an inversion input terminal to which the input voltage Vi is input, a non-inversion input terminal to which the second target voltage Vref2 is input, and an output terminal from which the differential voltage Vi−Vref2 is output, resistances R1, R2, and a capacitor C1 which are connected to the inversion input terminal of the operation amplifier, a resistance R3 and capacitors C2, C3 which are connected between the inversion input terminal of the operation amplifier and the output terminal thereof. The resistance R1 and capacitor C1 are connected in series, and the resistance R2 is connected in parallel to the series circuit. The resistance R3 and capacitor C3 are connected in series, and the capacitor C2 is connected in parallel to the series circuit. The resistance R3 and capacitors C2, C3 constitute the negative feedback circuit of the operation amplifier OP.

According to the above configuration of the comparison circuit 43*a*, time (target reaching time) required for the output of the comparison circuit 43*a* to reach the differential voltage Vi−Vref2 varies depending on the respective values of the resistances R1 to R3 and capacitors C1 to C3. That is, the magnification of an inversion amplifier circuit constituted by the operation amplifier OP is determined by a ratio between the combined resistance value of the resistances R1, R2 and the resistance R3, and charge time to the capacitor C3 is determined by the amount of negative feedback current which depends on the value of the resistance R3, so that the target reaching time gradually varies. This suppresses a steep variation in received power. Thus, stable power transmission can be achieved by adequately setting the magnification and charging time.

The power conversion circuit 20 in the wireless power transmitting device 2 controls the output of the feeding coil 21 based on the difference information thus received from the wireless power receiving device 3. Specifically, the power conversion circuit 20 controls the output of the feeding coil 21 so as to make the input voltage Vi and the second target voltage Vref2 equal to each other (that is, make the differential voltage Vi−Vref2 between the input voltage Vi and the second target voltage Vref2 zero). According to the above expression (1), the voltage Vo becomes equal to the first target voltage Vref1 when the input voltage Vi and the second target voltage Vref2 are equal to each other. Further, when the output voltage Vo reduces, the second target voltage Vref2 increases, so that when the power conversion circuit 20 performs the above control, the input voltage Vi increases and, correspondingly, the output voltage Vo increases. Conversely, when the output voltage Vo increases, the second target voltage Vref2 reduces, so that when the power conversion circuit 20 performs the above control, the input voltage Vi reduces and, correspondingly, the output voltage Vo reduces. Thus, by the above control of the power conversion circuit 20, the output voltage Vo can be converged to the first target voltage Vref1.

As described above, according to the wireless power receiving device 3 and wireless power transmission system 1 of the present embodiment, when the output voltage Vo is smaller than the first target voltage Vref1, the second target voltage Vref2 can be generated in such a direction as to increase the input voltage Vi; while when the output voltage Vo is larger than the first target voltage Vref1, the second target voltage Vref2 can be generated in such a direction as to reduce the input voltage Vi. Then, the power conversion circuit 20 in the wireless power transmitting device 2 controls the output of the feeding coil 21 so as to make the thus generated second target voltage Vref2 and the input voltage Vi equal to each other, thereby making it possible to converge the output voltage Vo to the first target voltage Vref1.

In the present embodiment, the input voltage Vi is the target of feedback control, so that the above-mentioned reduction in feedback speed, which may occur when the output voltage Vo is the target of feedback control, does not occur. Further, the output voltage Vo is converged to the first target voltage Vref1, so that, in the present embodiment, there does not occur a problem that voltage to be applied to the load 4 falls by a dropped voltage in the filter circuit 33 even though the input voltage Vi is the target of feedback control. Thus, according to the wireless power receiving device 3 and wireless power transmission system 1 of the present embodiment, it is possible to suitably perform feedback control even when the filter circuit 33 is provided at the front stage of the load 4.

Further, according to the present embodiment, the subtracting circuit 50*a* and adding circuit 51 are provided in the target voltage generation circuit 42, so that the second target voltage Vref2 can be suitably generated by the target voltage generation circuit 42.

Further, according to the present embodiment, since effective values of the respective input voltage Vi and output voltage Vo are used, influence of the ripple voltage on the input voltage Vi and output voltage Vo can be reduced; hence, the second target voltage Vref2 can be accurately generated.

The receiving-side transmitter 43 may transmit an error signal to the wireless power transmitting device 2 when the second target voltage Vref2 exceeds a prescribed reference value. With this configuration, it is possible to detect a failure of the filter circuit 33 on the wireless power transmitting device 2 side.

Figure 3:
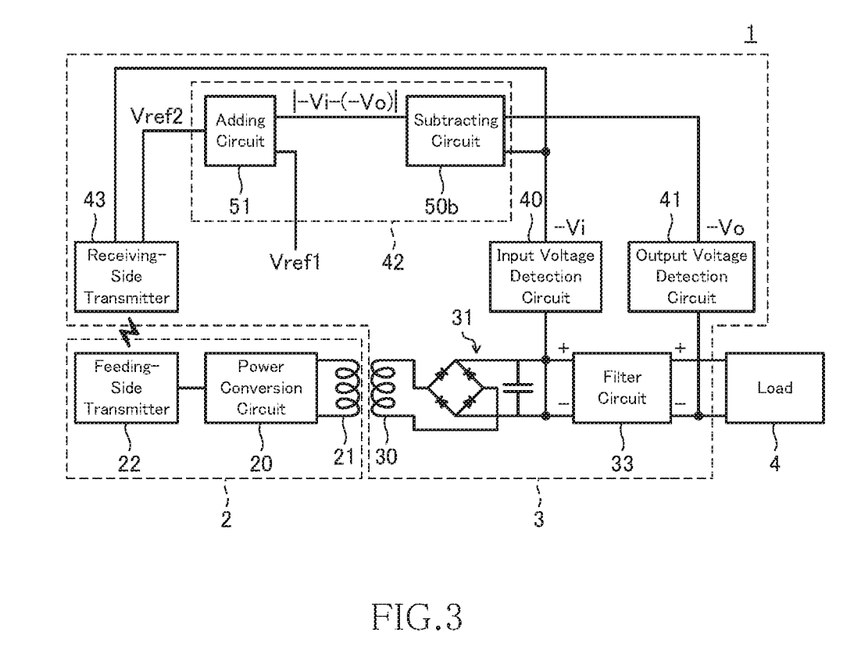
FIG. 3 is a view illustrating the configuration of the wireless power transmission system 1 according to a second embodiment of the present invention.

FIG. 3 is a view illustrating the configuration of the wireless power transmission system 1 according to the second embodiment of the present invention. The wireless power transmission system 1 according to the present embodiment differs from the wireless power transmission system 1 according to the first embodiment in that the input terminal of the input voltage detection circuit 40 is connected to the negative-side input terminal of the filter circuit 33, that the input terminal of the output voltage detection circuit 41 is connected to the negative-side output terminal of the filter circuit 33, and that the target voltage generation circuit 42 has a subtracting circuit 50*b* in place of the subtracting circuit 50*a*. Hereinafter, the same reference numerals are given to the same components as in the first embodiment, and description will be made focusing on the difference from the first embodiment.

As described above, the input terminal of the input voltage detection circuit 40 according to the present embodiment is connected to the negative-side input terminal of the filter circuit 33. Thus, in the present embodiment, voltage output from the input voltage detection circuit 40 has a sign (−Vi) that is opposite to Vi in the first embodiment.

Similarly, the input terminal of the output voltage detection circuit 41 according to the present embodiment is connected to the negative-side output terminal of the filter circuit 33 as described above. Thus, in the present embodiment, voltage output from the output voltage detection circuit 41 has a sign (−Vo) that is opposite to Vo in the first embodiment.

The subtracting circuit 50b according to the present embodiment is a circuit that calculates the absolute value |−Vi−(−Vo)| of a differential voltage −Vi−(−Vo) obtained by subtracting the output voltage (=−Vo) of the output voltage detection circuit 41 from the output voltage (=−Vi) of the input voltage detection circuit 40. Since the filter circuit 33 is a circuit that generates a voltage drop, Vi>Vo is always satisfied. Thus, the voltage |−Vi−(−Vo)| output from the subtracting circuit 50b is always equal to the differential voltage Vi−Vo output from the subtracting circuit 50a in the first embodiment, so that the above-described expression (1) is satisfied also in the present embodiment.

The receiving-side transmitter 43 in the present embodiment plays a role of receiving supply of the voltage −Vi from the input voltage detection circuit 40 and supply of the second target voltage Vref2 from the target voltage generation circuit 42 and, based on the received inputs, transmitting difference information indicating the difference between the input voltage Vi (voltage obtained by inverting the sign of the voltage −Vi supplied from the input voltage detection circuit 40) and the second target voltage Vref2 to the wireless power transmitting device 2. Processing performed on the wireless power transmitting device 2 side after reception of the difference information is the same as that in the first embodiment. The above expression (1) is satisfied also in the present embodiment, so that when the wireless power transmitting device 2 performs the same processing as that in the first embodiment, it is possible, also in the present embodiment, to suitably perform feedback control even when the filter circuit 33 is provided at the front stage of the load 4.

As described above, according to the wireless power receiving device 3 and wireless power transmission system 1 of the present embodiment, even though the input terminal of the input voltage detection circuit 40 is connected to the negative-side input terminal of the filter circuit 33, and the input terminal of the output voltage detection circuit 41 is connected to the negative-side output terminal of the filter circuit 33, it is possible to suitably perform feedback control even when the filter circuit 33 is provided at the front stage of the load 4, as in the first embodiment.

Figure 4:
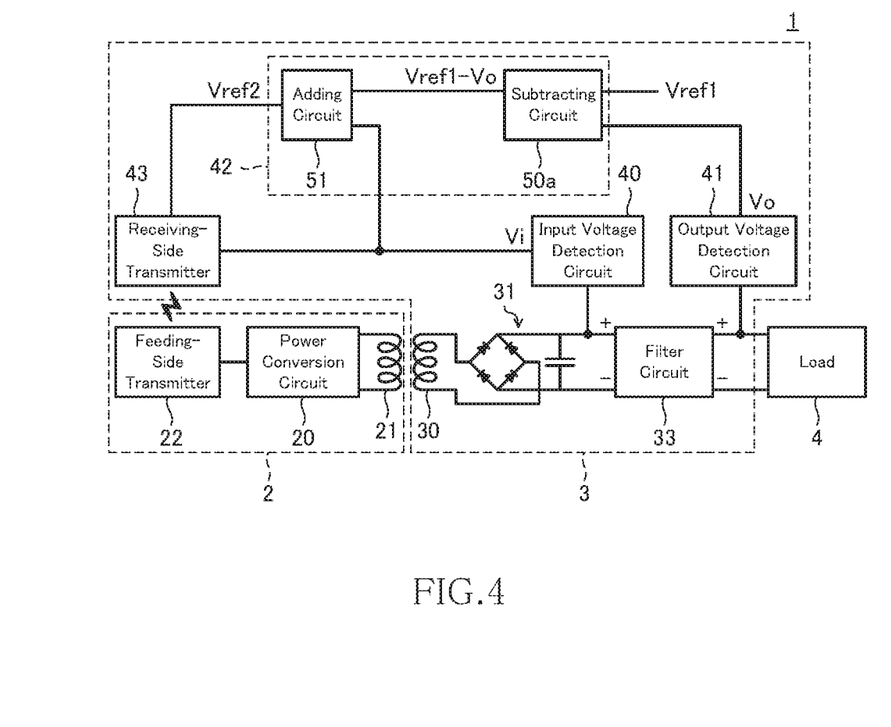
FIG. 4 is a view illustrating the configuration of the wireless power transmission system 1 according to a third embodiment of the present invention.

FIG. 4 is a view illustrating the configuration of the wireless power transmission system 1 according to the third embodiment of the present invention. The wireless power transmission system 1 according to the present embodiment differs from the wireless power transmission system 1 according to the first embodiment in terms of inputs to the respective subtracting circuit 50a and adding circuit 51. Hereinafter, the same reference numerals are given to the same components as in the first embodiment, and description will be made focusing on the difference from the first embodiment.

The first target voltage Vref1 and output voltage Vo are supplied, respectively, to the two input terminals of the subtracting circuit 50a according to the present embodiment. Based on the inputs supplied, the subtracting circuit 50a calculates a differential voltage Vref1−Vo obtained by subtracting the output voltage Vo from the first target voltage Vref1.

The input voltage Vi and the differential voltage Vref1−Vo output from the subtracting circuit 50a are supplied, respectively, to the two input terminals of the adding circuit 51 according to the present embodiment. Based on the inputs supplied, the adding circuit 51 adds the differential voltage Vref1−Vo to the input voltage Vi. A result of the addition is supplied to the receiving-side transmitter 43 as the second target voltage Vref2.

The second target voltage Vref2 thus supplied to the receiving-side transmitter 43 can be represented by the above expression (1). Thus, when the wireless power transmitting device 2 performs the same processing as in the first embodiment, it is possible, also in the present embodiment, to suitably perform feedback control even when the filter circuit 33 is provided at the front stage of the load 4.

As described above, also by the wireless power receiving device 3 and wireless power transmission system 1 according to the present embodiment, it is possible, as in the first embodiment, to suitably perform feedback control even when the filter circuit 33 is provided at the front stage of the load 4.

Figure 5:
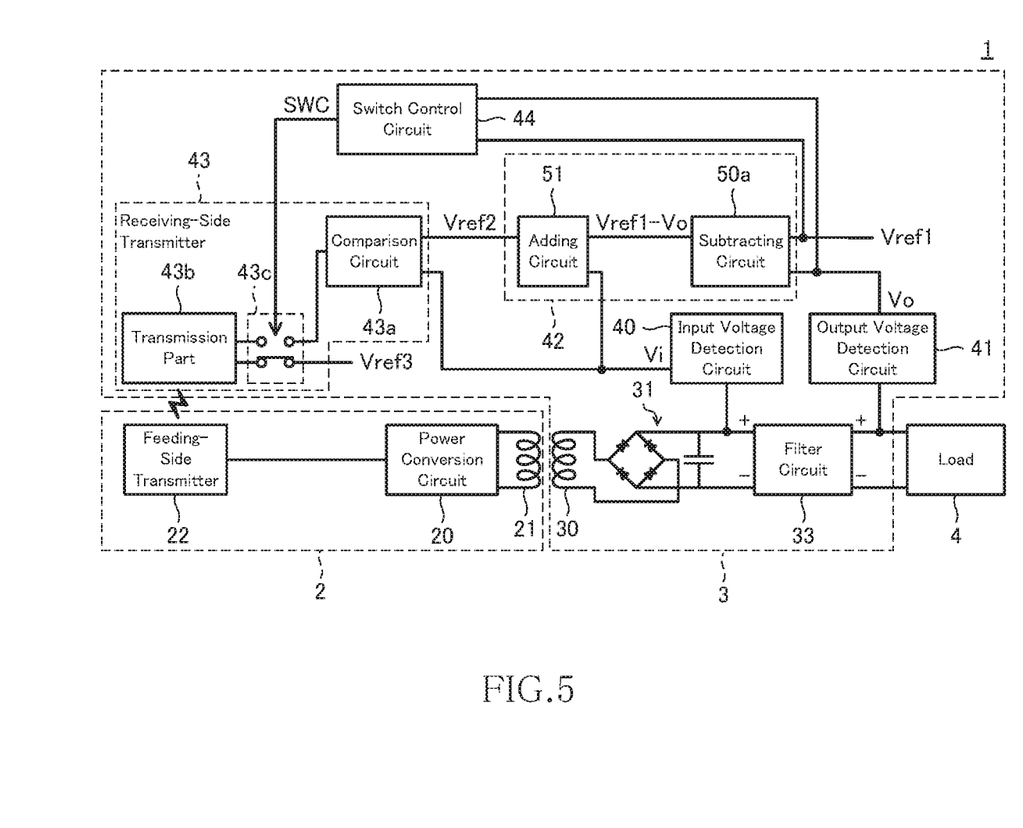
FIG. 5 is a view illustrating the configuration of the wireless power transmission system 1 according to a fourth embodiment of the present invention.

FIG. 5 is a view illustrating the configuration of the wireless power transmission system 1 according to the fourth embodiment of the present invention. The wireless power transmission system 1 according to the present embodiment differs from the wireless power transmission system 1 according to the third embodiment in that it has a switch control circuit 44 and that it has a switching circuit 43c in the receiving-side transmitter 43. Hereinafter, the same reference numerals are given to the same components as in the third embodiment, and description will be made focusing on the difference from the third embodiment.

The receiving-side transmitter 43 according to the present embodiment includes the comparison circuit 43a, transmission part 43b, and a switching circuit 43c. The detailed configurations of the comparison circuit 43a and transmission part 43b are as described with reference to FIGS. 2A and 2B.

The switching circuit 43c is a circuit that selects one of the differential voltage Vi−Vref2 supplied from the comparison circuit 43a and a third target voltage Vref3 and supplies the selected voltage to the transmission part 43b. The third target voltage Vref3 is a fixed potential supplied from a not-shown power supply provided in the wireless power receiving device 3. The value of the third target voltage Vref3 is set to an arbitrary negative value. The transmission part 43b transmits only one voltage thus supplied thereto to the wireless power transmitting device 2.

The switch control circuit 44 is a circuit that generates a control signal SWC based on the first target voltage Vref1 and output voltage Vo and supplies the generated control signal SWC to the switching circuit 43c. According to the received control signal SWC, the switching circuit 43c selects one from the differential voltage Vi−Vref2 and the third target voltage Vref3.

Specifically, when the first target voltage Vref1 is larger than the output voltage Vo (Vref1>Vo), the switch control circuit 44 generates the control signal SWC so as to make the switching circuit 43c select the third target voltage Vref3; otherwise (Vref1≤Vo), the switch control circuit 44 generates the control signal SWC so as to make the switching circuit 43c select the differential voltage Vi−Vref2. As a result, the voltage to be transmitted to the wireless power transmitting device 2 is the third target voltage Vref3 when Vref1>Vo and is the differential voltage Vi−Vref2 when Vref1≤vo.

The operation of the wireless power transmission system 1 when the differential voltage Vi−Vref2 is transmitted to the wireless power transmitting device 2 is the same as that in the third embodiment. That is, the output of the feeding coil 21 is controlled so as to make the differential voltage Vi−Vref2 zero and, as a result, the value of the output voltage Vo is converged to the first target voltage Vref1. The control in this case is performed in such a direction as to reduce the output voltage Vo since the value of the differential voltage Vi−Vref2 (=Vo−Vref1) is always non-negative.

On the other hand, when the third target voltage Vref3 is transmitted to the wireless power transmitting device 2, the wireless power transmission system 1 controls the output of the feeding coil 21 so as to make the third target voltage Vref3 having a negative value zero. Since the third target voltage Vref3 is a fixed value, the output of the feeding coil 21 is made to gradually increase in this control and, as a result, the output voltage Vo also gradually increases. When the thus increased output voltage Vo satisfies Vref1≤Vo, the differential voltage Vi−Vref2 is transmitted to the wireless power transmitting device 2, and then control is performed in such a direction as to reduce the output voltage Vo. As a result, the value of the output voltage Vo is converged to the first target voltage Vref1.

That is, in the present embodiment, a control different from that in the third embodiment is performed only when the output voltage Vo is smaller than the first target voltage Vref1 and, in this control, an input to the wireless power transmitting device 2 is fixed to the third target voltage Vref3, so that according to the present embodiment, it is possible to adequately control the increase rate of the output voltage Vo per unit time by setting an appropriate value to the third target voltage Vref3.

As described above, according to the wireless power receiving device 3 and wireless power transmission system 1 of the present embodiment, it is possible to obtain such an effect that the increase rate of the output voltage Vo per unit time can be adequately controlled in addition to the same effect as obtained in the third embodiment, in which it is possible to suitably perform feedback control even when the filter circuit 33 is provided at the front stage of the load 4.

Figure 6:
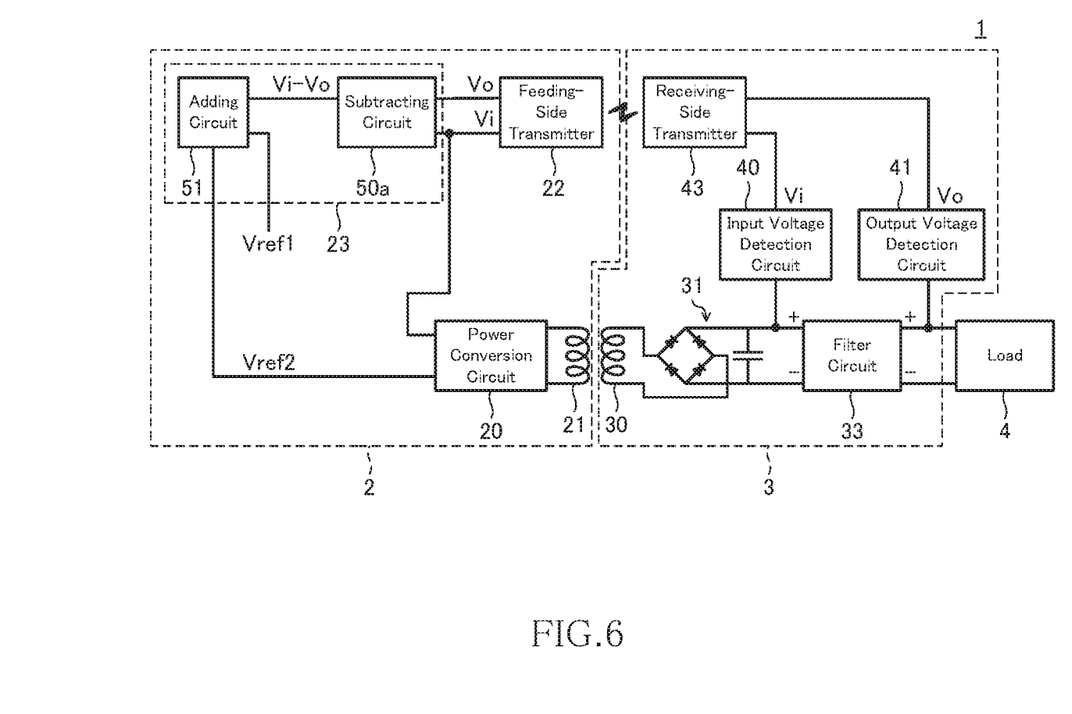
FIG. 6 is a view illustrating the configuration of the wireless power transmission system 1 according to a fifth embodiment of the present invention.

FIG. 6 is a view illustrating the configuration of the wireless power transmission system 1 according to the fifth embodiment of the present invention. The wireless power transmission system 1 according to the present embodiment differs from the wireless power transmission system 1 according to the first embodiment in that it has a target voltage generation circuit 23 in place of the target voltage generation circuit 42. Hereinafter, the same reference numerals are given to the same components as in the first embodiment, and description will be made focusing on the difference from the first embodiment.

The receiving-side transmitter 43 according to the present embodiment is configured to transmit, not the difference information indicating the difference between the input voltage Vi and the second target voltage Vref2, but the input voltage Vi and the output voltage Vo to the wireless power transmitting device 2. The feeding-side transmitter 22 receives the thus transmitted input voltage Vi and output voltage Vo and supplies them to the target voltage generation circuit 23.

Unlike the target voltage generation circuit 42 described in the first embodiment, the target voltage generation circuit 23 is disposed in the wireless power transmitting device 2. The target voltage generation circuit 23 has the same configuration and carries out the same operation as the target voltage generation circuit 42 described in the first embodiment and is configured to generate the second target voltage Vref2 using the subtracting circuit 50a and adding circuit 51.

That is, the subtracting circuit 50a is configured to calculate the differential voltage Vi−Vo between the input voltage Vi and the output voltage Vo supplied from the feeding-side transmitter 22. The adding circuit 51 is configured to add the first target voltage Vref1 and the differential voltage Vi−Vo output from the subtracting circuit 50a and output a result of the addition as the second target voltage Vref2. The second target voltage Vref2 output from the adding circuit 51 is supplied to the power conversion circuit 20. Control performed by the power conversion circuit 20 that has received the second target voltage Vref2 is as described in the first embodiment. Thus, the output voltage Vo can be converged to the first target voltage Vref1, whereby, also in the present embodiment, it is possible to suitably perform feedback control even when the filter circuit 33 is provided at the front stage of the load 4.

As described above, also by the wireless power receiving device 3 and wireless power transmission system 1 according to the present embodiment, it is possible, as in the first embodiment, to suitably perform feedback control even when the filter circuit 33 is provided at the front stage of the load 4.

While, in the present embodiment, the target voltage generation circuit 42 according to the first embodiment is replaced by the target voltage generation circuit 23 in the wireless power transmitting device 2, the target voltage generation circuit 42 according to each of the first to fourth embodiments may be replaced by the target voltage generation circuit 23 in the wireless power transmitting device 2. In this case, in the fourth embodiment illustrated in FIG. 5, the switch control circuit 44, comparison circuit 43a, and switching circuit 43c are also preferably replaced by the same circuits in the wireless power transmitting device 2.

Figure 7:
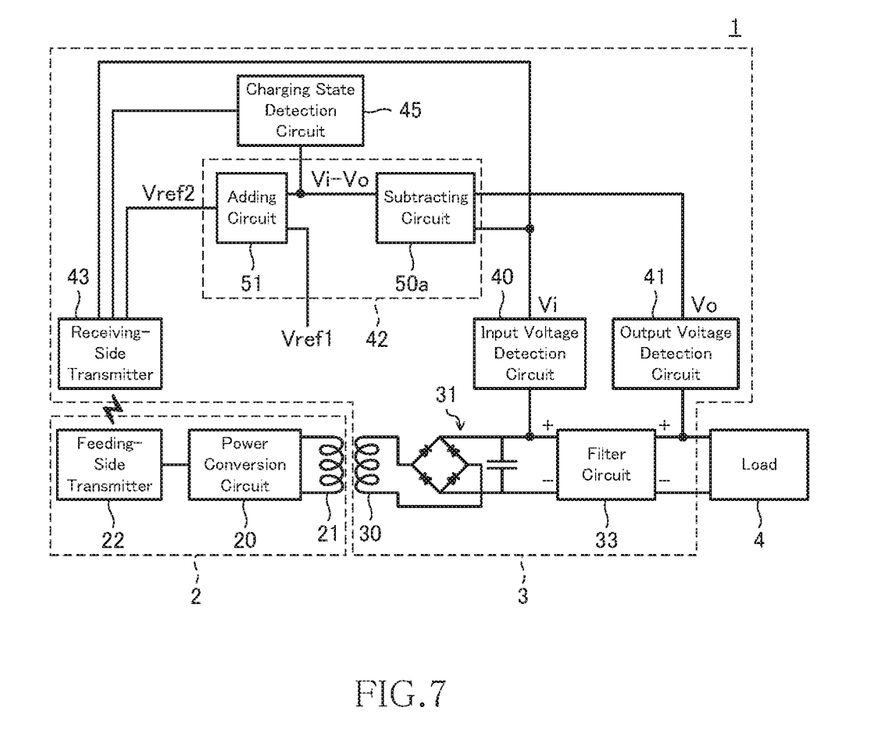
FIG. 7 is a view illustrating the configuration of the wireless power transmission system 1 according to a sixth embodiment of the present invention.

FIG. 7 is a view illustrating the configuration of the wireless power transmission system 1 according to the sixth embodiment of the present invention. The wireless power transmission system 1 according to the present embodiment differs from the wireless power transmission system 1 according to the first embodiment in that it further has a charging state detection circuit 45. Hereinafter, the same reference numerals are given to the same components as in the first embodiment, and description will be made focusing on the difference from the first embodiment.

The charging state detection circuit 45 is a circuit that determines the charging state of the load 4 as a secondary battery based on a change in the differential voltage Vi−Vo output from the subtracting circuit 50a. The charging state detection circuit 45 makes the determination by utilizing the property of the differential voltage Vi−Vo that the value thereof reduces as the charging of the load 4 progresses.

The charging state detection circuit 45 is configured to transmit information indicating a result of the determination to the wireless power transmitting device 2 through the receiving-side transmitter 43. The wireless power transmitting device 2 is configured to notify a user of the charging state of the load 4 based on the thus transmitted information. Similarly, also in the wireless power receiving device 3, the charging state of the load 4 may be notified to the user based on the determination result of the charging state detection circuit 45.

As described above, according to the wireless power receiving device 3 and wireless power transmission system 1 of the present embodiment, it is possible to grasp the charging state of the load 4 as a secondary battery by utilizing the output of a circuit (specifically, subtracting circuit 50a) for feedback control. Further, it is possible to notify the user of the grasped charging state.

While the preferred embodiments of the present invention have been described, the present invention is not limited to the above embodiments and may be implemented in various forms without departing from the sprit and the scope of the invention.

For example, the target voltage generation circuit may be constituted by, e.g., a microprocessor having functions of both subtracting and adding circuits. In this case, the first target voltage Vref1 is a fixed value stored in advance in a not-shown storage circuit.

REFERENCE SIGNS LIST

1: Wireless power transmission system
2: Wireless power transmitting device
3: Wireless power receiving device
4: Load
20: Power conversion circuit
21: Feeding coil
22: Feeding-side transmitter
23, 42: Target voltage generation circuit
30: Receiving coil
31: Rectification circuit
33: Filter circuit
40: Input voltage detection circuit
41: Output voltage detection circuit
43: Receiving-side transmitter
43a: Comparison circuit
43b: Transmission part
43c: Switching circuit
44: Switch control circuit
45: Charging state detection circuit
50a, 50b: Subtracting circuit
51: Adding circuit
SWC: Control signal
Vi: Input voltage to filter circuit 33
Vo: Output voltage from filter circuit 33
Vref1: First target voltage
Vref2: Second target voltage
Vref3: Third target voltage

What is claimed is:

1. A wireless power receiving device that receives power transmitted from a wireless power transmitting device by wireless, the wireless power receiving device comprising:
    a receiving coil that receives AC power through an AC magnetic field;
    a rectification circuit that converts the AC power received by the receiving coil into DC power and outputs an obtained DC power to a load;
    a filter circuit provided between the rectification circuit and the load;
    an input voltage detection circuit that detects an input voltage of the filter circuit;
    an output voltage detection circuit that detects an output voltage of the filter circuit;
    a target voltage generation circuit that generates a second target voltage that is a target value of the input voltage based on the output voltage and a first target voltage that is a target value of the output voltage; and
    a receiving-side transmitter that transmits difference information indicating a difference between the input voltage and the second target voltage to the wireless power transmitting device.

2. The wireless power receiving device as claimed in claim 1, wherein the target voltage generation circuit includes:
    a subtracting circuit that calculates a differential voltage between the input voltage and the output voltage; and
    an adding circuit that adds the differential voltage to the first target voltage to thereby generate the second target voltage.

3. The wireless power receiving device as claimed in claim 1, wherein the target voltage generation circuit includes:
    a subtracting circuit that calculates a differential voltage between the output voltage and the first target voltage; and
    an adding circuit that adds the differential voltage to the input voltage to thereby generate the second target voltage.

4. The wireless power receiving device as claimed in claim 2, wherein the receiving-side transmitter transmits an error signal to the wireless power transmitting device when the second target voltage exceeds a reference value.

5. The wireless power receiving device as claimed in claim 2, further comprising a charging state detection circuit that determines a charge state of the load based on a change in the differential voltage.

6. The wireless power receiving device as claimed in claim 3, wherein the receiving-side transmitter transmits an error signal to the wireless power transmitting device when the second target voltage exceeds a reference value.

7. The wireless power receiving device as claimed in claim 1,
    wherein the input voltage detection circuit detects the input voltage as an effective value, and
    wherein the output voltage detection circuit detects the output voltage as an effective value.

8. A wireless power transmission system that transmits power from a wireless power transmitting device to a wireless power receiving device by wireless,
    wherein the wireless power transmitting device includes:
        a power conversion circuit that converts input DC power into AC power;
        a feeding coil that generates an AC magnetic field by receiving the AC power from the power conversion circuit; and
        a feeding-side transmitter that exchanges information with the wireless power receiving device,
    wherein the wireless power receiving device is the wireless power receiving devices as claimed in claim 1, and
    wherein the power conversion circuit controls AC power to be supplied to the feeding coil based on the difference information transmitted from the receiving-side transmitter to the feeding-side transmitter.

9. A wireless power transmission system that transmits power from a wireless power transmitting device to a wireless power receiving device by wireless,
    wherein the wireless power transmitting device includes:
        a power conversion circuit that converts input DC power into AC power;
        a feeding coil that generates an AC magnetic field by receiving the AC power from the power conversion circuit; and
        a feeding-side transmitter that exchanges information with the wireless power receiving device,
    wherein the wireless power receiving device includes:
        a receiving coil that receives AC power through the AC magnetic field;
        a rectification circuit that converts the AC power received by the receiving coil into DC power and outputs the obtained DC power to a load;
        a filter circuit provided between the rectification circuit and the load;

an input voltage detection circuit that detects the input voltage of the filter circuit;

an output voltage detection circuit that detects the output voltage of the filter circuit; and a receiving-side transmitter that transmits the input voltage and the output voltage to the wireless power transmitting device, wherein the wireless power transmitting device further includes a target voltage generation circuit that generates a second target voltage as a target value of the input voltage based on the output voltage and a first target voltage as a target value of the output voltage, and wherein the power conversion circuit controls AC power to be supplied to the feeding coil based on difference information indicating a difference between the input voltage and the second target voltage.

\* \* \* \* \*